United States Patent
Kaminaka

(10) Patent No.: US 11,250,557 B2
(45) Date of Patent: *Feb. 15, 2022

(54) REFERENCE IMAGE GENERATING APPARATUS, IMAGE FORMING SYSTEM, REFERENCE IMAGE GENERATION METHOD, AND REFERENCE IMAGE GENERATION PROGRAM

(71) Applicant: KONICA MINOLTA, INC., Tokyo (JP)

(72) Inventor: Junpei Kaminaka, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,574

(22) Filed: Jan. 14, 2020

(65) Prior Publication Data
US 2020/0234421 A1    Jul. 23, 2020

(30) Foreign Application Priority Data
Jan. 18, 2019 (JP) .............. JP2019-007221

(51) Int. Cl.
*G06T 7/00* (2017.01)
*G06F 3/12* (2006.01)
*H04N 1/00* (2006.01)

(52) U.S. Cl.
CPC ............ *G06T 7/001* (2013.01); *G06F 3/1208* (2013.01); *G06F 3/1237* (2013.01); *H04N 1/00472* (2013.01); *G06T 2207/30144* (2013.01)

(58) Field of Classification Search
USPC ............. 358/1.1–3.29, 1.11–1.18, 501–504; 382/190–221, 306; 399/8–31, 72, 389
See application file for complete search history.

(56) References Cited

U.S. PATENT DOCUMENTS 5,712,921 A * 1/1998 Zabele ................ B41F 33/0036
382/112
9,007,658 B2   4/2015 Ito
(Continued)

FOREIGN PATENT DOCUMENTS

JP    2003136818 A    5/2003
JP    2005250327 A    9/2005
(Continued)

OTHER PUBLICATIONS

Related U.S. Appl. No. 16/742,516, First Named Inventor: Shoichi Ayukawa; Title: "Inspection Apparatus, Image Forming System, Inspection Program, and Inspection Method"; filed Jan. 14, 2020.
(Continued)

*Primary Examiner* — Marcellus J Augustin
(74) *Attorney, Agent, or Firm* — Holtz, Holtz & Volek PC

(57) ABSTRACT

A reference image generating apparatus includes: a reader that reads a printed matter transported from an image forming apparatus; a reference image generator that generates a reference image for automatically inspecting the printed matter based on a read image generated by reading the printed matter; and a hardware processor, wherein the hardware processor acquires, from the image forming apparatus, information on whether or not each paper of the printed matter to be transported to the reader is subject to automatic inspection.

29 Claims, 16 Drawing Sheets

(56) References Cited

U.S. PATENT DOCUMENTS

| | | | |
|---|---|---|---|
| 9,060,084 B2 | 6/2015 | Kaminaka | |
| 2012/0070040 A1* | 3/2012 | Vans | H04N 1/00015 |
| | | | 382/112 |
| 2013/0148863 A1* | 6/2013 | Muraishi | G06T 7/33 |
| | | | 382/112 |
| 2019/0362486 A1* | 11/2019 | Diao | G06K 9/4642 |
| 2020/0233618 A1 | 7/2020 | Ayukawa | |

FOREIGN PATENT DOCUMENTS

| | | | |
|---|---|---|---|
| JP | 2007089095 A | 4/2007 | |
| JP | 2007148027 A | 6/2007 | |
| JP | 2007241413 A | 9/2007 | |
| JP | 2009025652 A | 2/2009 | |
| JP | 2011118564 A | 6/2011 | |
| JP | 2014185941 A | 10/2014 | |
| JP | 2015118050 A | 6/2015 | |
| JP | 2015230687 A | 12/2015 | |
| JP | 2016061659 A | 4/2016 | |
| JP | 2017056668 A | 3/2017 | |

OTHER PUBLICATIONS

Japanese Office Action (and English language translation thereof) dated Aug. 5, 2021 issued in counterpart Japanese Application No. 2019-007221.

Japanese Office Action (and English language translation thereof) dated Sep. 21, 2021 issued in counterpart Japanese Application No. 2019-007221.

Japanese Office Action (and English language translation thereof) dated Aug. 10, 2021 issued in counterpart Japanese Application No. 2019-007221.

Office Action (Non-Final Rejection) dated Nov. 16, 2021, issued in related U.S. Appl. No. 16/742,516.

Chinese Office Action (and English language translation thereof) dated Sep. 27, 2021, issued in Chinese Application No. 202010034544.5 (which is a counterpart of related U.S. Appl. No. 16/742,516).

\* cited by examiner

FIG. 9

| | FIRST PAGE | SECOND PAGE | THIRD PAGE | FOURTH PAGE |
|---|---|---|---|---|
| WHEN OUTPUTTING CORRECT ANSWER CREATION JOB | 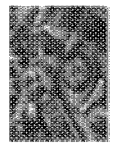<br>PLAIN PAPER | <br>EMBOSSED PAPER | <br>FINE PAPER | 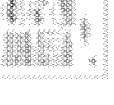<br>EMBOSSED PAPER |
| WHEN STORING CORRECT ANSWER JOB | INSPECTION VALID PAGE<br>PLAIN PAPER | REFERENCE IMAGE IS NOT STORED<br>INSPECTION INVALID PAGE<br>EMBOSSED PAPER | INSPECTION VALID PAGE<br>FINE PAPER | REFERENCE IMAGE IS NOT STORED<br>INSPECTION INVALID PAGE<br>EMBOSSED PAPER |
| WHEN OUTPUTTING INSPECTION JOB | <br>INSPECTION VALID PAGE<br>PLAIN PAPER | <br>INSPECTION INVALID PAGE<br>EMBOSSED PAPER | <br>INSPECTION VALID PAGE<br>FINE PAPER | 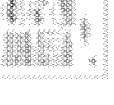<br>INSPECTION INVALID PAGE<br>EMBOSSED PAPER |

FIG. 11

| | FIRST PAGE | SECOND PAGE | THIRD PAGE | FOURTH PAGE |
|---|---|---|---|---|
| WHEN OUTPUTTING CORRECT ANSWER CREATION JOB | 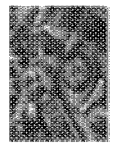<br>PLAIN PAPER | <br>EMBOSSED PAPER | <br>FINE PAPER | 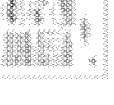<br>EMBOSSED PAPER |
| WHEN STORING CORRECT ANSWER JOB | <br>INSPECTION VALID PAGE<br>PLAIN PAPER | <br>INSPECTION INVALID PAGE<br>EMBOSSED PAPER | <br>INSPECTION VALID PAGE<br>FINE PAPER | 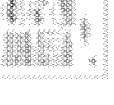<br>INSPECTION INVALID PAGE<br>EMBOSSED PAPER |
| WHEN OUTPUTTING INSPECTION JOB | 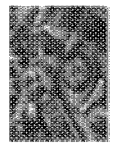<br>INSPECTION VALID PAGE<br>PLAIN PAPER | <br>INSPECTION INVALID PAGE<br>EMBOSSED PAPER | <br>INSPECTION VALID PAGE<br>FINE PAPER | 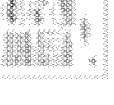<br>INSPECTION INVALID PAGE<br>EMBOSSED PAPER |

FIG. 15

| | FIRST PAGE | SECOND PAGE | THIRD PAGE | FOURTH PAGE |
|---|---|---|---|---|
| WHEN OUTPUTTING CORRECT ANSWER CREATION JOB | <br>PLAIN PAPER | <br>EMBOSSED PAPER | <br>FINE PAPER | 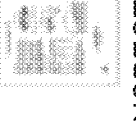<br>EMBOSSED PAPER |
| WHEN STORING CORRECT ANSWER JOB | <br>INSPECTION VALID PAGE<br>PLAIN PAPER | <br>INSPECTION VALID PAGE<br>FINE PAPER | | |
| WHEN OUTPUTTING INSPECTION JOB | <br>INSPECTION VALID PAGE<br>PLAIN PAPER | <br>INSPECTION INVALID PAGE<br>EMBOSSED PAPER | <br>INSPECTION VALID PAGE<br>FINE PAPER | 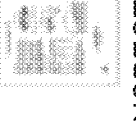<br>INSPECTION INVALID PAGE<br>EMBOSSED PAPER |

REFERENCE IMAGE GENERATING APPARATUS, IMAGE FORMING SYSTEM, REFERENCE IMAGE GENERATION METHOD, AND REFERENCE IMAGE GENERATION PROGRAM

The entire disclosure of Japanese patent Application No. 2019-007221, filed on Jan. 18, 2019, is incorporated herein by reference in its entirety.

BACKGROUND

Technological Field

The present invention relates to a reference image generating apparatus, an image forming system, a reference image generation method, and a reference image generation program.

Description of the Related Art

In recent years, in the field of production printing, technology for improving the image quality of printing and stabilizing the image quality is actively developed. As one of such technologies, there is an image forming system having an automatic inspection function for automatically inspecting an image of a printed matter.

In such an image forming system, by comparing an image of a printed matter that has been confirmed to have high image quality (hereinafter referred to as "quality") by a user with an image obtained by reading the printed matter of main printing, it is determined whether the printed matter of the main printing has sufficient quality.

In addition, as an image of a printed matter whose quality has been confirmed (hereinafter referred to as "reference image"), an image registered in advance can be used, or a new image can be created. When a new reference image is created, the same image as the print job for main printing is printed, and the read image of the printed matter is stored as a reference image in the image forming system.

However, in creating a reference image for automatic inspection, if a reference image is created using a paper that has been set for paper that is not subject to automatic inspection (for example, embossed paper, index paper, post inserter (PI) paper, punched paper, unprinted paper), and inspection is performed in a later process, the reference image may be determined to be scraped. For example, in the case of embossed paper, the shape of unevenness differs from paper to paper, and therefore it may be determined to be scraped.

In relation to this, JP 2007-89095 A describes "a selection of an image page of a printed job to be subject to inspection," but does not describe "a reference image page corresponding to a page of a printed job not subject to inspection."

However, it is troublesome for the user to select in advance the pages that are not inspected. Further, there is a problem that this selecting is performed not only when a reference image is created, but also at the time of an inspection.

SUMMARY

The present invention has been made in view of the above circumstances, and an object is to provide a reference image generating apparatus, an image forming system, a reference image generation method, and a reference image generation program that can save the user from selecting the pages that is not subject to inspection in advance.

To achieve the abovementioned object, according to an aspect of the present invention, a reference image generating apparatus reflecting one aspect of the present invention comprises: a reader that reads a printed matter transported from an image forming apparatus; a reference image generator that generates a reference image for automatically inspecting the printed matter based on a read image generated by reading the printed matter; and a hardware processor, wherein the hardware processor acquires, from the image forming apparatus, information on whether or not each paper of the printed matter to be transported to the reader is subject to automatic inspection, when the paper is subject to the automatic inspection, the hardware processor stores that the reference image is valid in the automatic inspection, when the paper is not subject to the automatic inspection, the hardware processor stores that the reference image is invalid in the automatic inspection, when the reference image is valid in the automatic inspection, the hardware processor stores the reference image, and when the reference image is invalid in the automatic inspection, the hardware processor does not store the reference image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 9 is a schematic diagram illustrating the management of reference images by a correct answer job in the first embodiment;

FIG. 11 is a schematic diagram illustrating the management of reference images by correct answer jobs in the second embodiment;

FIG. 15 is a schematic diagram illustrating the management of reference images by a correct answer job in the fourth embodiment;

DETAILED DESCRIPTION OF EMBODIMENTS

Figure 1:
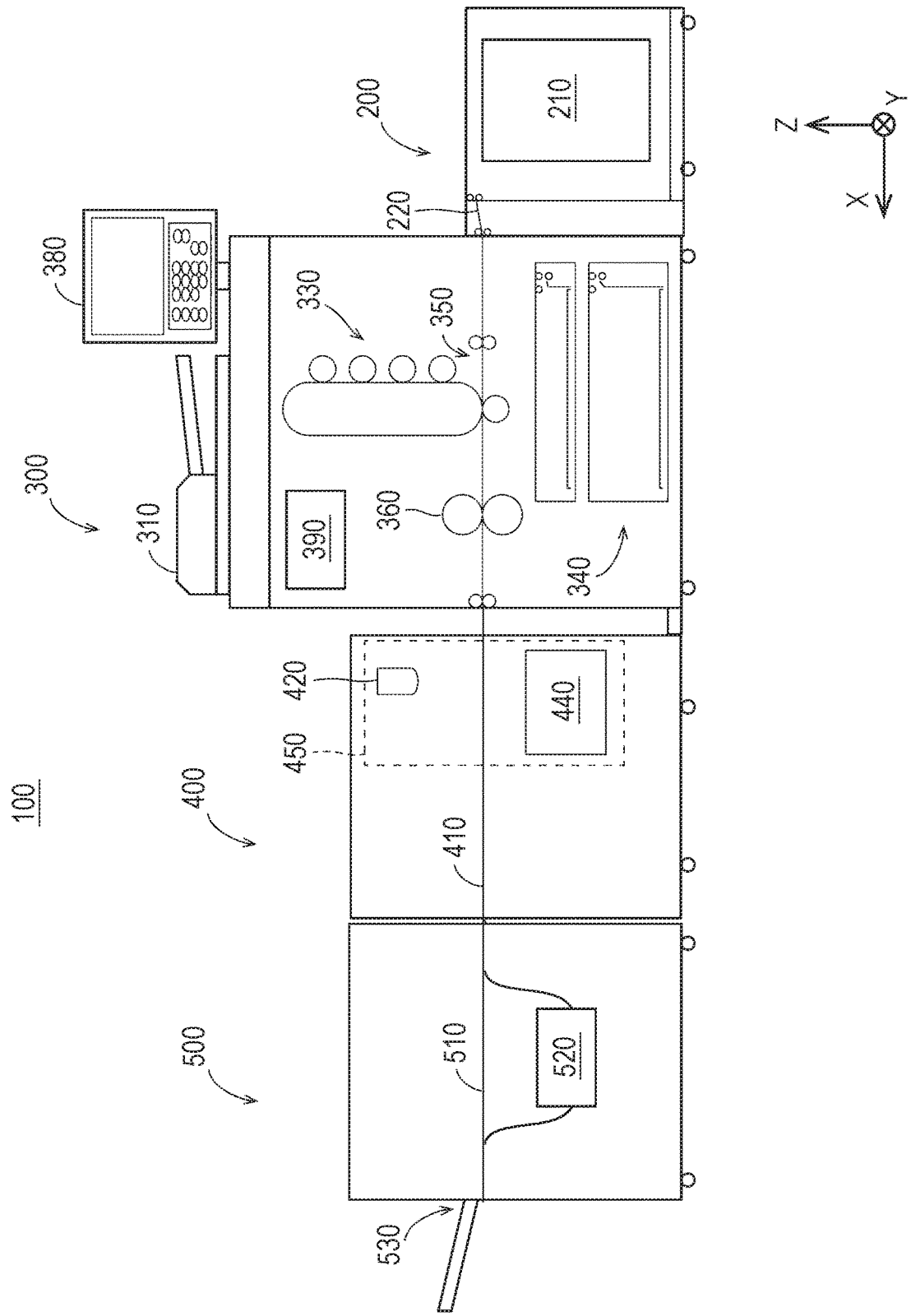
FIG. 1 is a schematic cross-sectional view illustrating the configuration of an image forming system according to a first embodiment.

Hereinafter, one or more embodiments of the present invention will be described with reference to the drawings. However, the scope of the invention is not limited to the disclosed embodiments. Now that, in the description of the drawings, the same elements are denoted by the same reference numerals, and redundant description will be omitted. In addition, the dimensional ratios in the drawings are exaggerated for convenience of explanation, and may be different from the actual ratios.

First Embodiment

<Image Forming System 100>

Figure 2:
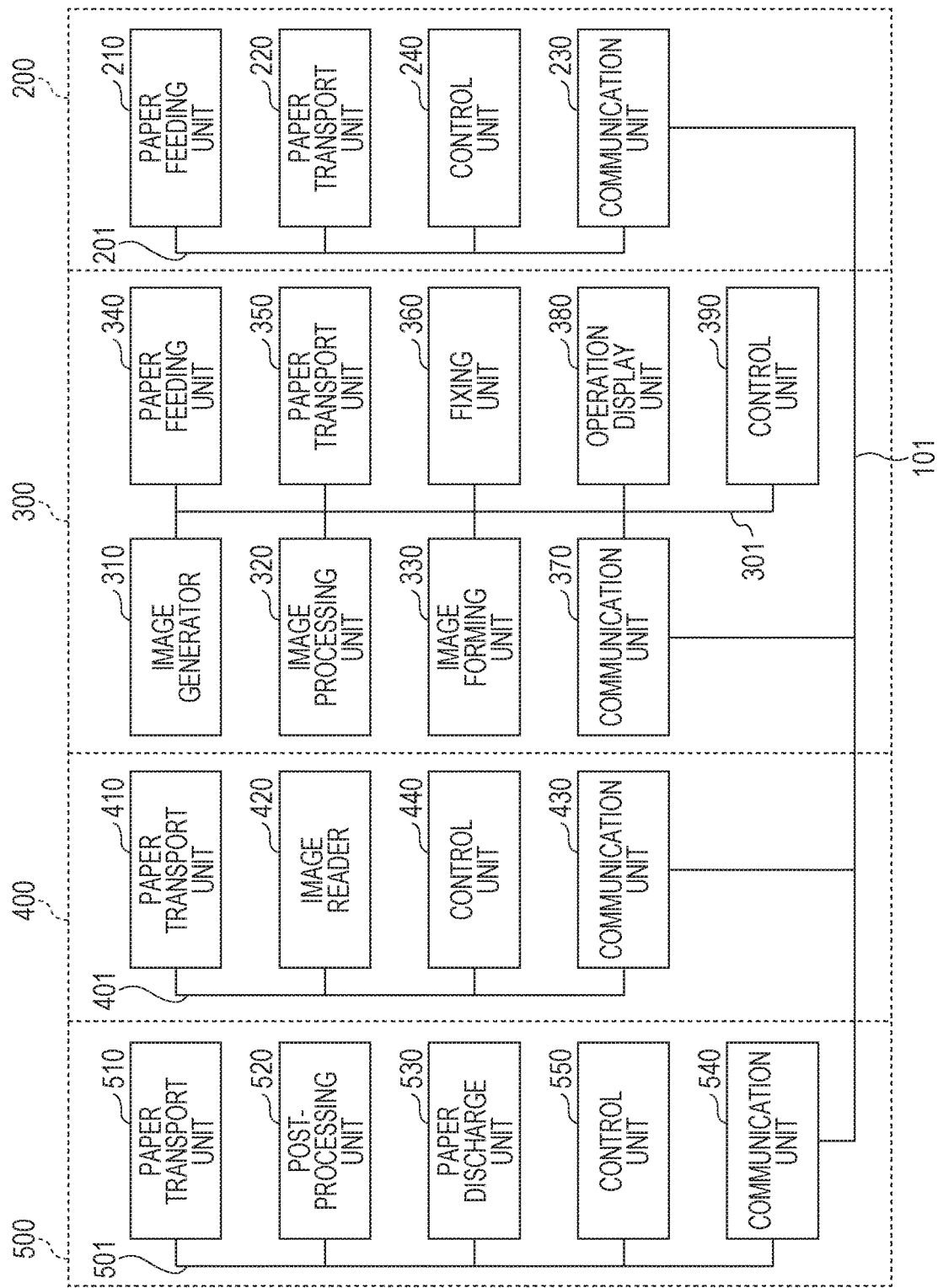
FIG. 2 is a schematic block diagram of the image forming system illustrated in FIG. 1.
Figure 3:
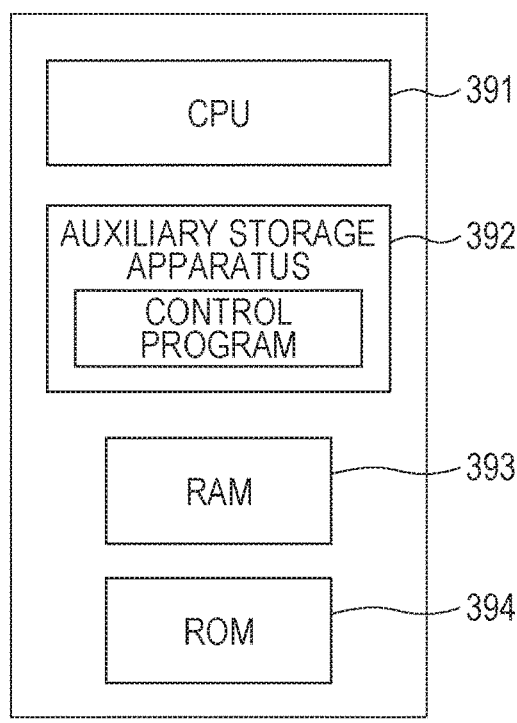
FIG. 3 is a schematic block diagram illustrating the configuration of a control unit of an image forming apparatus illustrated in FIG. 2.
Figure 4:
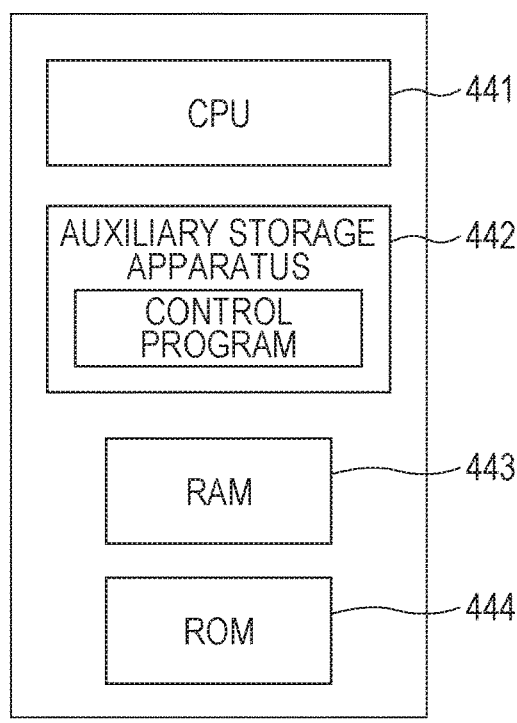
FIG. 4 is a schematic block diagram illustrating the configuration of a control unit of a first post-processing apparatus illustrated in FIG. 2.

FIG. 1 is a schematic cross-sectional view illustrating the configuration of an image forming system of a first embodiment, and FIG. 2 is a schematic block diagram of an image forming system 100 illustrated in FIG. 1. Further, FIG. 3 is a schematic block diagram illustrating the configuration of a control unit 390 of an image forming apparatus 300 illustrated in FIG. 2, and FIG. 4 is a schematic block diagram illustrating the configuration of a control unit 440 of the first post-processing apparatus 400 illustrated in FIG. 2.

As illustrated in FIG. 1, the image forming system 100 according to the present embodiment includes a paper feeder 200, the image forming apparatus 300, the first post-processing apparatus 400, and a second post-processing apparatus 500, which are connected in series along the X direction (paper transport direction). Note that the configuration of the image forming system 100 illustrated in FIG. 1 is an example, and the type and number of apparatuses included in the image forming system 100 are not limited to the example illustrated in FIG. 1.

<Paper Feeder 200>

The paper feeder 200 supplies a paper to the image forming apparatus 300 in response to an instruction from the image forming apparatus 300. As illustrated in FIGS. 1 and 2, the paper feeder 200 includes a paper feed unit 210, a paper transport unit 220, a communication unit 230, and a control unit 240. The paper feed unit 210, the paper transport unit 220, the communication unit 230, and the control unit 240 are communicably connected to each other via an internal bus 201.

The paper feed unit 210 includes at least one paper feed tray and stores papers as a recording material used for printing. The papers stored in the paper feed tray are supplied to the image forming apparatus 300 one by one along a transport path of the paper transport unit 220 by a plurality of pairs of transport rollers. When a plurality of paper feed trays is provided, papers with different paper settings (for example, embossed paper, index paper, etc.) can be stored in each paper feed tray.

The communication unit 230 exchanges control signals and data with the image forming apparatus 300. The control unit 240 controls the paper feed unit 210, the paper transport unit 220, and the communication unit 230.

<Image Forming Apparatus 300>

The image forming apparatus 300 forms (prints) an image on a paper based on a print job including print data and print setting data in page description language (PDL) format that are stored in advance. As will be described later, in the present embodiment, the print job includes an inspection job for forming an image to be inspected on the paper in the main printing and a correct answer creation job for generating a reference image before the main printing.

Further, the image forming apparatus 300 receives a print job from an external client terminal via a network and prints an image on a paper based on the print job. The client terminal can be, for example, a personal computer, a tablet terminal, a smartphone, or the like.

The image forming apparatus 300 includes an image generating unit 310, an image processing unit 320, an image forming unit 330, a paper feed unit 340, a paper transport unit 350, a fixing unit 360, a communication unit 370, an operation display unit 380, and a control unit 390. These components are communicably connected to each other via an internal bus 301.

The image generating unit 310 includes an optical system including a mirror and a lens, and a reading sensor. The image generating unit 310 reads an original placed on a reading surface or an original transported by an auto document feeder (ADF) and outputs an image signal.

The image processing unit 320 performs various types of image processing on the image signal received from the image generating unit 310 and generates print image data. Further, the image processing unit 320 generates print image data based on the print setting data and the print data included in the print job received by the communication unit 370. The generated print image data is transmitted to the image forming unit 330.

The image forming unit 330 prints an image on a paper based on the print image data using a known image forming process such as an electrophotographic method including charging, exposure, development, and transfer processes. The image forming unit 330 includes a photosensitive drum as an image carrier and a charging unit, an optical writing unit, a developing apparatus, and a transfer unit disposed around the photosensitive drum.

The paper feed unit 340 supplies a paper to the image forming unit 330. The paper feed unit 340 includes a plurality of paper feed trays, and each paper feed tray can store papers having different sizes such as A4 size and A3 size.

The paper transport unit 350 includes a transport path and a plurality of pairs of transport rollers and transports papers in the image forming apparatus 300. Further, the paper transport unit 350 includes a paper reversing unit and a circulation transport unit, and can reverse and discharge the front and back of a fixed paper or form images on both sides of a paper.

The fixing unit 360 fixes a toner image formed on a paper. The fixing unit 360 includes a hollow heating roller in which a heater is disposed and a pressure roller facing the heating roller. The heating roller and the pressure roller are controlled to a predetermined temperature (for example, 100° C. or more) by a heater, and heat/pressurize a paper to fix the toner image.

The paper on which the image is fixed is supplied to the first post-processing apparatus 400 through a paper discharge unit (not illustrated).

The communication unit 370 is connected to a client terminal such as a personal computer via a network, and transmits and receives data such as a print job.

The operation display unit 380 has an input unit and an output unit. The input unit includes, for example, a keyboard, buttons, and a touch panel, and is used by the user to perform various instructions (input) such as character input using the keyboard, various settings, and a print start instruction using the print start button. Further, the output unit includes a display and is used for presenting various setting screens such as a job ticket editing screen to be described later, the execution status of a print job, and the like to the user. The operation display unit 380 functions as a notifier.

The control unit 390 controls the image generating unit 310, the image processing unit 320, the image forming unit 330, the paper feed unit 340, the paper transport unit 350, the fixing unit 360, the communication unit 370, and the operation display unit 380. As illustrated in FIG. 3, the control unit 390 includes a CPU 391, an auxiliary storage apparatus 392, a RAM 393, and a ROM 394.

The CPU 391 executes a control program for the image forming apparatus and realizes various functions. The control program is stored in the auxiliary storage apparatus 392 and loaded into the RAM 393 when executed by the CPU 391. The auxiliary storage apparatus 392 includes a large-capacity storage apparatus such as a hard disk drive or a flash memory, and stores the control program and the print job. The RAM 393 stores calculation results, paper setting information, paper feed tray information, and the like associated with the execution by the CPU 391. The ROM 394 stores various parameters, various programs, and the like.

<First Post-Processing Apparatus 400>

The first post-processing apparatus 400 includes a paper transport unit 410, an image reading unit 420, a communication unit 430, and a control unit 440. These components are communicably connected to each other via an internal bus 401.

The paper transport unit 410 includes a transport path and a plurality of pairs of transport rollers, and transports the paper supplied from the image forming apparatus 300 toward the second post-processing apparatus 500 along a transport path. The paper transport unit 410 functions as a paper transport apparatus that transports a paper from the image forming apparatus 300 to the image reading unit 420.

The image reading unit 420 is an inline sensor (scanner) disposed on the transport path of the paper transport unit 410 and reads an image on a paper transported on the transport path. The communication unit 430 exchanges control signals and data with the image forming apparatus 300.

The control unit 440 controls the paper transport unit 410, the image reading unit 420, and the communication unit 430. As illustrated in FIG. 4, the control unit 440 includes a CPU 441, an auxiliary storage apparatus 442, a RAM 443, and a ROM 444.

The CPU 441 executes a control program for the first post-processing apparatus and realizes various functions. The control program is stored in the auxiliary storage apparatus 442 and loaded into the RAM 443 when executed by the CPU 441. The auxiliary storage apparatus 442 includes a large-capacity storage apparatus such as a hard disk drive or a flash memory. The RAM 443 stores calculation results accompanying the execution of the CPU 441.

Further, in the present embodiment, the auxiliary storage apparatus 442 or the RAM 443 functions as a storage unit that stores a reference image, which will be described later, and information on validity/invalidity of the reference image in inspection. The ROM 444 stores various parameters and various programs.

In the present embodiment, the CPU 441 of the control unit 440 functions as the reference image generating apparatus 450 together with the image reading unit 420 by executing the control program (function as a reference image generation program). The reference image generating apparatus 450 reads the printed matter output from the image forming apparatus 300 by the image reading unit 420, generates a reference image based on the read image, and controls storage of the reference image. A specific processing procedure regarding the control of storing the reference image will be described later.

In the present embodiment, the reference image is an image obtained by reading a printed matter obtained by executing a print job by the image reading unit 420, and the quality is confirmed by a user. The reference image is a reference for determining whether or not an image printed on a paper by executing an inspection job is normal in automatic inspection.

In addition, the control unit 440 and the image reading unit 420 can function as an image inspection unit when an inspection job is executed. The image inspection unit determines whether or not the read image of the inspection job is normal based on the read image obtained by executing the inspection job and the reference image.

<Second Post-Processing Apparatus 500>

The second post-processing apparatus 500 transports or post-processes a paper supplied from the first post-processing apparatus 400 in accordance with an instruction from the image forming apparatus 300, and discharges the paper to the outside of the image forming system 100. The second post-processing apparatus 500 includes a paper transport unit 510, a post-processing unit 520, a paper discharge unit 530, a communication unit 540, and a control unit 550. These components are communicably connected to each other via an internal bus 501.

The paper transport unit 510 includes a transport path and a plurality of pairs of transport rollers, transports a paper supplied from the first post-processing apparatus 400 along the transport path, and supplies the paper to the post-processing unit 520 or the paper discharge unit 530.

The post-processing unit 520 performs post-processing on the transported paper. Examples of the post-processing include punching, stapling, and side stitching.

The paper discharge unit 530 includes a paper discharge tray and a pair of paper discharge rollers, and a paper supplied from the first post-processing apparatus 400 and transported through the transport path or a post-processed paper is discharged to a paper discharge tray.

The communication unit 540 exchanges control signals and data with the image forming apparatus 300. The control unit 550 controls the paper transport unit 510, the post-processing unit 520, the paper discharge unit 530, and the communication unit 540.

<Control Method of Image Forming System 100>

Figure 5:
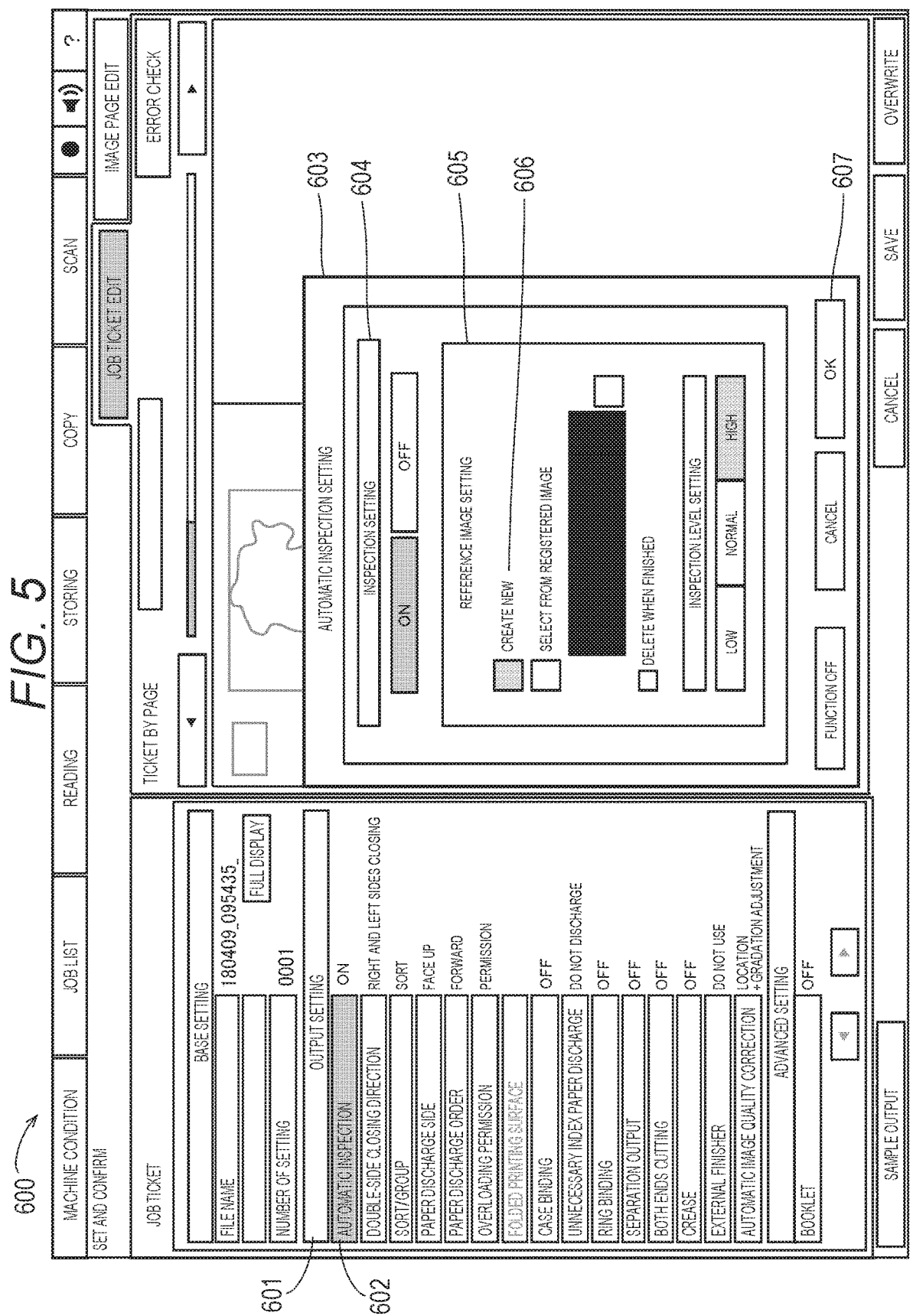
FIG. 5 is a schematic view illustrating the case where automatic inspection setting is performed on a "job ticket edit" screen.
Figure 6:
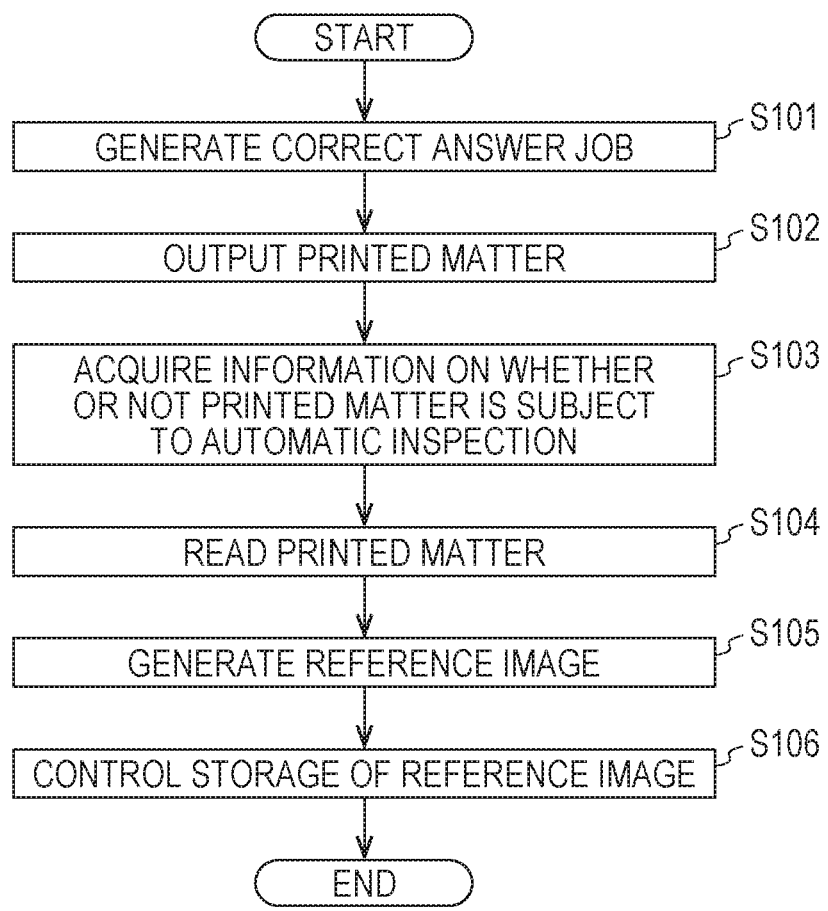
FIG. 6 is a flowchart illustrating a schematic processing procedure of a control method of the image forming system in the case of generating a reference image in the first embodiment.

A control method of the image forming system 100 of the present embodiment will be described with reference to FIGS. 5 and 6. FIG. 5 is a schematic diagram illustrating the case where automatic inspection setting is performed on the "job ticket edit" screen, and FIG. 6 is a flowchart illustrating a schematic processing procedure of a control method of the image forming system 100 in the case of generating a reference image in the first embodiment. The process illustrated in FIG. 6 is realized by the cooperation of the control unit 390 and the control unit 440. The control unit 390 plays a leading role in output control and overall control, etc. of a printed matter in the processing of FIG. 6, and the control unit 440 plays roles such as correct answer job generation, reference image generation, and storage control, which will be described later.

Hereinafter, with reference to FIG. 5, description will be made assuming that a user operates a "job ticket edit" screen and performs settings for generating a reference image.

The image forming system 100 according to the present embodiment includes an automatic inspection function as one function in the output of a print job, and can automatically perform inspection using a reference image for main printing. Further, settings relating to automatic inspection (hereinafter referred to as "automatic inspection setting") can be performed on the "job ticket edit" screen 600.

More specifically, on the "job ticket edit" screen 600, by selecting "automatic inspection" 602 in the "output setting" 601 items, an "automatic inspection setting" screen 603 is launched, and various settings relating to automatic inspection can be performed from the "automatic inspection setting" screen 603. Note that the items other than the "automatic inspection" 602 in the "output setting" 601 items are the same as those in an image forming system having a conventional automatic inspection function, and thus detailed description thereof will be omitted.

The "automatic inspection setting" screen 603 has an "inspection setting" 604 for setting ON/OFF of the automatic inspection function and a "reference image setting" 605 for selecting whether to create a new reference image or select a reference image from a registered image. When the inspection setting 604 is ON, the user can create and acquire a new reference image or can acquire a reference image from an existing registered image. The acquired reference image is stored in the auxiliary storage apparatus 442 or the RAM 443 of the control unit 440, for example.

In the example illustrated in FIG. 5, the "inspection setting" 604 is set to ON, and the "reference image setting" 605 is set to "new creation". When "OK" button 607 is selected while "new creation" 606 is selected in the "reference image setting" 605, the control unit 390 starts creating a new reference image. A schematic processing procedure for creating a new reference image is as follows. In FIG. 6, steps S101, S103 to S106 relate to processing on the reference image generating apparatus 450 side, and step S102 relates to processing on the image forming apparatus 300 side.

As illustrated in FIG. 6, the control unit 440 generates a correct answer job (step S101). In the reference image generating apparatus 450, the correct answer job is a management job for storing a reference image generated based on a read image of a printed matter in association with information indicating whether the reference image is valid or invalid in an inspection. The control unit 440 generates a correct answer job based on the correct answer creation job (print job for generating a reference image) generated by the image forming apparatus 300. Thereby, the control unit 440 manages the reference image in a job format corresponding to the correct answer creation job.

Next, a printed matter is output (step S102). The control unit 390 executes a correct answer creation job. The correct answer creation job may be, for example, a print job generated by changing the number of copies of an inspection job from a plurality of copies to one copy. The inspection job is stored in advance in the auxiliary storage apparatus 392 or the RAM 393. A correspondence relationship is always maintained among the correct answer creation job, the correct answer job, and the inspection job, and the reference image of each page of the correct answer job is linked to the corresponding page of the inspection job (refer to FIG. 9).

In accordance with an instruction from the control unit 390, the image forming unit 330 prints an image on a paper based on the print data until the number of papers set in print setting of the correct answer creation job is reached.

Next, information on whether or not the paper is subject to automatic inspection (hereinafter referred to as "inspection target page information") is acquired (step S103). The control unit 390 generates inspection target page information for each paper of printed matter and transmits it to the control unit 440, based on the paper setting information and paper tray information, The control unit 440 receives the inspection target page information.

The paper setting information and the paper feed tray information are included in the print setting data of the correct answer creation job. Although not illustrated in FIG. 5, a user can check the setting status through a job ticket editing screen or the like. The paper setting information can include, for example, paper size, paper type, basis weight, colored paper, embossed paper, index paper, PI paper, presence/absence of punch holes, unprinted insertion paper, and the like.

The control unit 390 is subject to automatic inspection, for example, in the case where the paper type is plain paper or fine paper, or if it is colored paper, for each paper of printed matter corresponding to each page of print data. On the other hand, the control unit 390 is not subject to automatic inspection, for example, in the case where the paper is embossed paper, index paper, PI paper, punched holes, and unprinted insertion paper.

Next, the printed matter is read (step S104). The image reading unit 420 reads the printed matter transported from the image forming apparatus 300 and transmits the read image to the control unit 440.

Next, a reference image is generated (step S105). The control unit 440 generates a reference image for automatically inspecting a printed matter based on the read image generated by reading the printed matter by the image reading unit 420. Here, the quality of the generated read image can be confirmed by the user and approved for use as a reference image.

Next, storage of the reference image is controlled (step S106). The control unit 440 stores that the generated reference image is valid in automatic inspection when a printed matter is subject to the automatic inspection. On the other hand, when the printed matter is not subject to the automatic inspection, the control unit 440 stores that the generated reference image is invalid in the automatic inspection.

More specifically, the control unit 440 stores the page information of the correct answer job as the inspection valid page for the reference image generated by reading a paper which is subject to automatic inspection. On the other hand, the page information of the correct answer job is stored as an inspection invalid page for the reference image generated by reading a paper not subject to automatic inspection.

Then, when the generated reference image is valid as an inspection page for automatic inspection, the control unit 440 determines that this reference image should be stored and stores this reference image. On the other hand, when the generated reference image is invalid as an inspection page for automatic inspection, the control unit 440 determines that the reference image should not be stored and does not store the reference image.

If the generated reference image is not stored, the user may be confirmed not to store the reference image.

As described above, in the process shown in the flowchart of FIG. 6, the reference image generating apparatus 450 reads the printed matter transported from the image forming apparatus 300, and generates a reference image for automatically inspecting the printed matter based on the read image. Further, the reference image generating apparatus 450 acquires inspection target page information from the image forming apparatus 300 for each paper of a printed matter, and controls storage of the generated reference image based on the inspection target page information.

Figure 7:
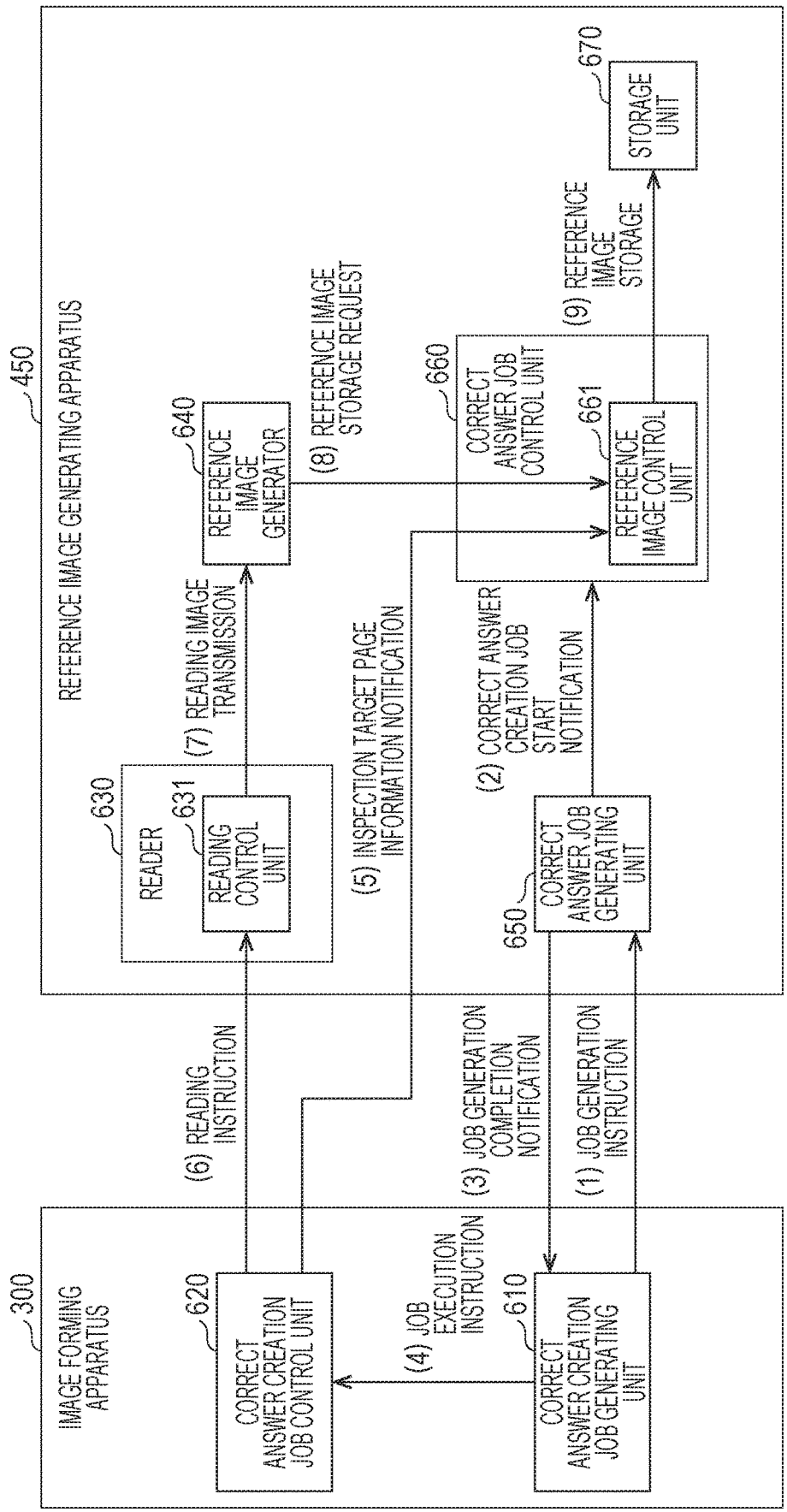
FIG. 7 is a functional block diagram illustrating main functional configurations of an image forming apparatus and a reference image generating apparatus in the case of generating a reference image in the first embodiment.
Figure 8:
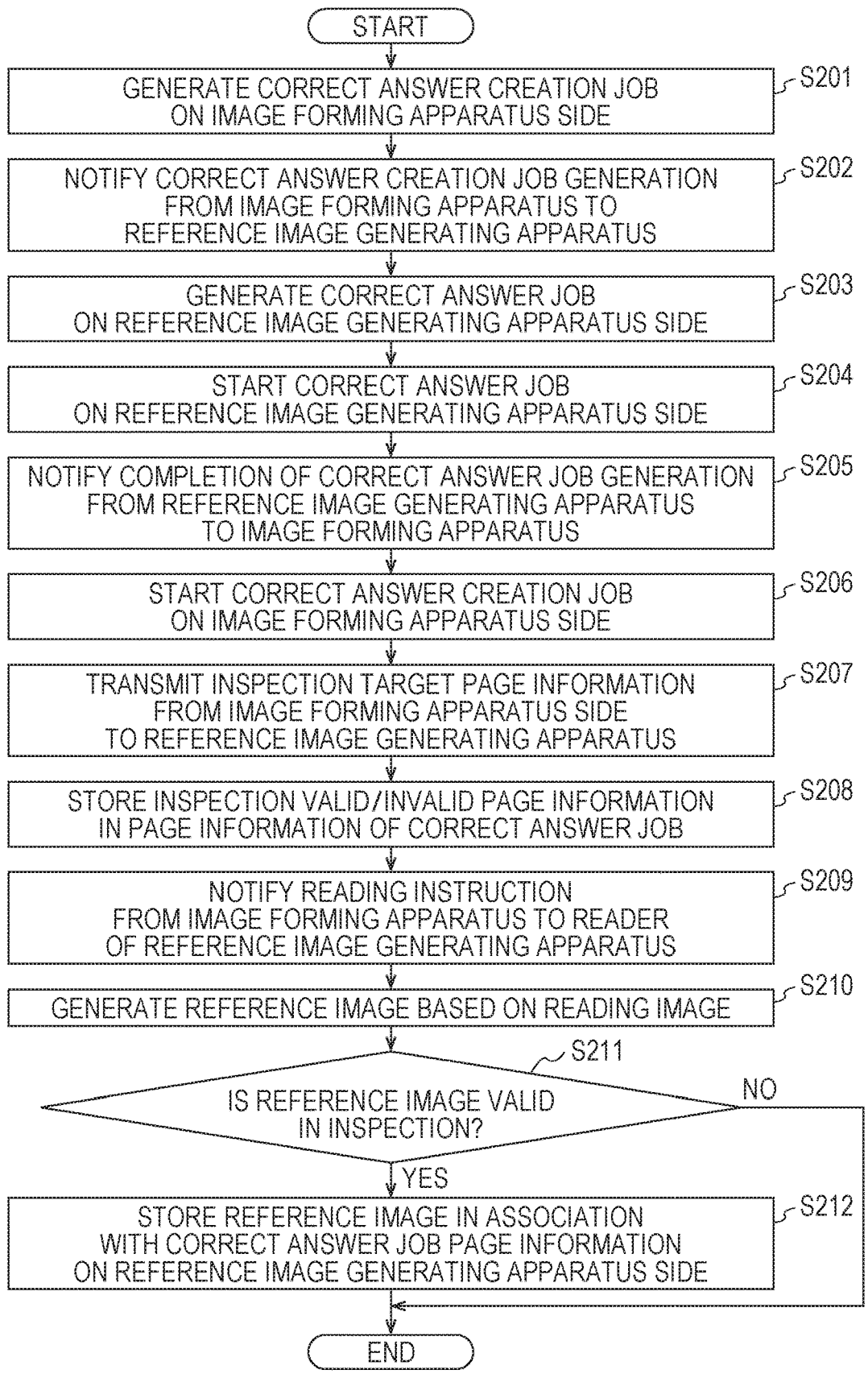
FIG. 8 is a flowchart illustrating a processing procedure for generating a reference image according to the functional configuration of FIG. 7.

Hereinafter, the procedure for generating the reference image will be described in detail with reference to FIGS. 7 and 8. FIG. 7 is a functional block diagram illustrating the main functional configurations of the image forming apparatus 300 and the reference image generating apparatus 450 in the case of generating a reference image in the first embodiment. Further, FIG. 8 is a flowchart illustrating a processing procedure for generating a reference image according to the functional configuration of FIG. 7. The processing of the flowchart in FIG. 8 is realized by the cooperation of the control unit 390 and the control unit 440.

As illustrated in FIG. 7, the image forming apparatus 300 includes a correct answer creation job generating unit 610 and a correct answer creation job control unit 620, and these are realized by the CPU 391 of the control unit 390 executing a control program for the image forming apparatus.

Further, the reference image generating apparatus 450 includes a reader 630, a reference image generator 640, a correct answer job generating unit 650, a correct answer job control unit 660, and a storage unit 670. The reader 630 is realized by the image reading unit 420, and the reference image generator 640, the correct answer job generating unit 650, and the correct answer job control unit 660 are realized by the CPU 441 of the control unit 440 executing the control program for the first post-processing apparatus. Further, the storage unit 670 is realized by the auxiliary storage apparatus 442 or the RAM 443 of the control unit 440. A processing procedure for generating a reference image with such a configuration is, for example, as follows.

As illustrated in FIG. 8, first, a correct answer creation job is generated on the image forming apparatus 300 side (step S201). The correct answer creation job generating unit 610 generates a correct answer creation job. Further, the correct answer creation job generating unit 610 outputs (1) a job generation instruction to the correct answer job generating unit 650. Note that, in FIG. 7, "(1)" added to the head of the control signal "job generation instruction" means that this control signal is output first. The same applies to "(2)" and thereafter.

Next, the correct image creation job generation is notified from the image forming apparatus 300 to the reference image generating apparatus 450 (step S202). The correct answer job generating unit 650 outputs "(2) correct answer creation job start notification" to notify the correct answer job control unit 660 that the image forming apparatus 300 is ready.

Next, a correct answer job is generated on the reference image generating apparatus 450 side (step S203). The correct answer job generating unit 650 generates a correct answer job.

Next, a correct answer job on the reference image generating apparatus 450 side is started (step S204). The correct answer job generating unit 650 starts the correct answer job.

Next, the completion of correct answer job generation is notified from the reference image generating apparatus 450 to the image forming apparatus 300 (step S205). The correct answer job generating unit 650 outputs "(3) job generation completion notification" to the correct answer creation job generating unit 610.

Next, the correct answer creation job on the image forming apparatus 300 side is started (step S206). The correct answer creation job generating unit 610 outputs "(4) job execution instruction" to the correct answer creation job control unit 620.

Next, inspection target page information is transmitted from the image forming apparatus 300 to the reference image generating apparatus 450 (step S207). The correct answer creation job control unit 620 notifies the reference image control unit 661 of the correct answer job control unit 660 of "(5) inspection target page information".

Next, inspection valid/invalid page information is stored in the page information of the correct answer job (step S208). Depending on whether a paper of a printed matter is/is not subject to automatic inspection, the reference image control unit 661 determines the validity/invalidity in the automatic inspection of the reference image and stores the inspection valid/invalid page information in the page information of the correct answer job.

Next, a reading instruction is notified from the image forming apparatus 300 to the reader 630 of the reference image generating apparatus 450 (step S209). The correct answer creation job control unit 620 notifies the reading control unit 631 of the reader 630 of "(6) reading instruction".

Next, a reference image is generated based on the read image (step S210). The reader 630 reads the printed matter transported from the image forming apparatus 300 and performs "(7) reading image transmission". The reference image generator 640 generates a reference image based on the read image generated by the reader 630 and outputs "(8) reference image storage request" to the reference image control unit 661.

Next, it is determined whether or not the reference image is valid in the inspection (step S211). The reference image control unit 661 determines whether the reference image generated by the reference image generator 640 is valid in the inspection based on the inspection target page information.

When the reference image is valid in the inspection (step S211: YES), the reference image is stored in the storage unit 670 in association with the page information of the correct answer job on the reference image generating apparatus 450 side ("(9) reference image storage") (step S212), and the process ends (END). On the other hand, if the reference image is not valid in the inspection, that is, invalid (step S211: NO), the process ends without storing the reference image (END).

Thus, in the present embodiment, the inspection target page information is transmitted from the image forming apparatus 300 to the reference image generating apparatus 450 for each output page of the correct answer creation job, and the reference image control unit 661 stores the inspection valid/invalid page information as the page information of the correct answer job. In the case of an inspection valid page (that is, a paper on which the reference image should be generated), the reference image is stored, and in the case of an inspection invalid page (that is, a paper on which the reference image should not be generated), the reference image is not stored.

EXAMPLE

FIG. 9 is a schematic view illustrating management of reference images by a correct answer job in the first embodiment. It is assumed that embossed paper is included on the second and fourth pages in four-page correct answer job output. All pages are output as a correct answer creation job, but the second and fourth pages are not stored as the reference images for a correct answer job. In addition, the second and fourth pages are inspection invalid pages and are not subject to automatic inspection. Therefore, the reference image control unit 661 stores the correct answer job using the first and third pages as reference images. Note that in FIG. 9, although the case where the paper setting is embossed paper is given as an example, but the same applies to other paper settings such as index paper, PI paper, paper with punch holes, and unprinted insertion paper.

The reference image generating apparatus 450 and the image forming system 100 of the present embodiment described above have the following effects.

Reference images are not stored for papers that are not subject to automatic inspection, and therefore this can save the user from selecting the pages that is not subject to inspection in advance. Further, it is possible to prevent or suppress occurrence of erroneous detection in post-process inspection.

Second Embodiment

In the first embodiment, the case has been described where whether or not the reference image is stored is controlled according to the validity/invalidity of the reference image in the inspection. In the second embodiment, a case will be described in which a reference image is stored regardless of whether the reference image is valid or invalid in the inspection of automatic inspection. Note that the description of the same configuration as that of the first embodiment will be omitted to avoid duplication of description.

Figure 10:
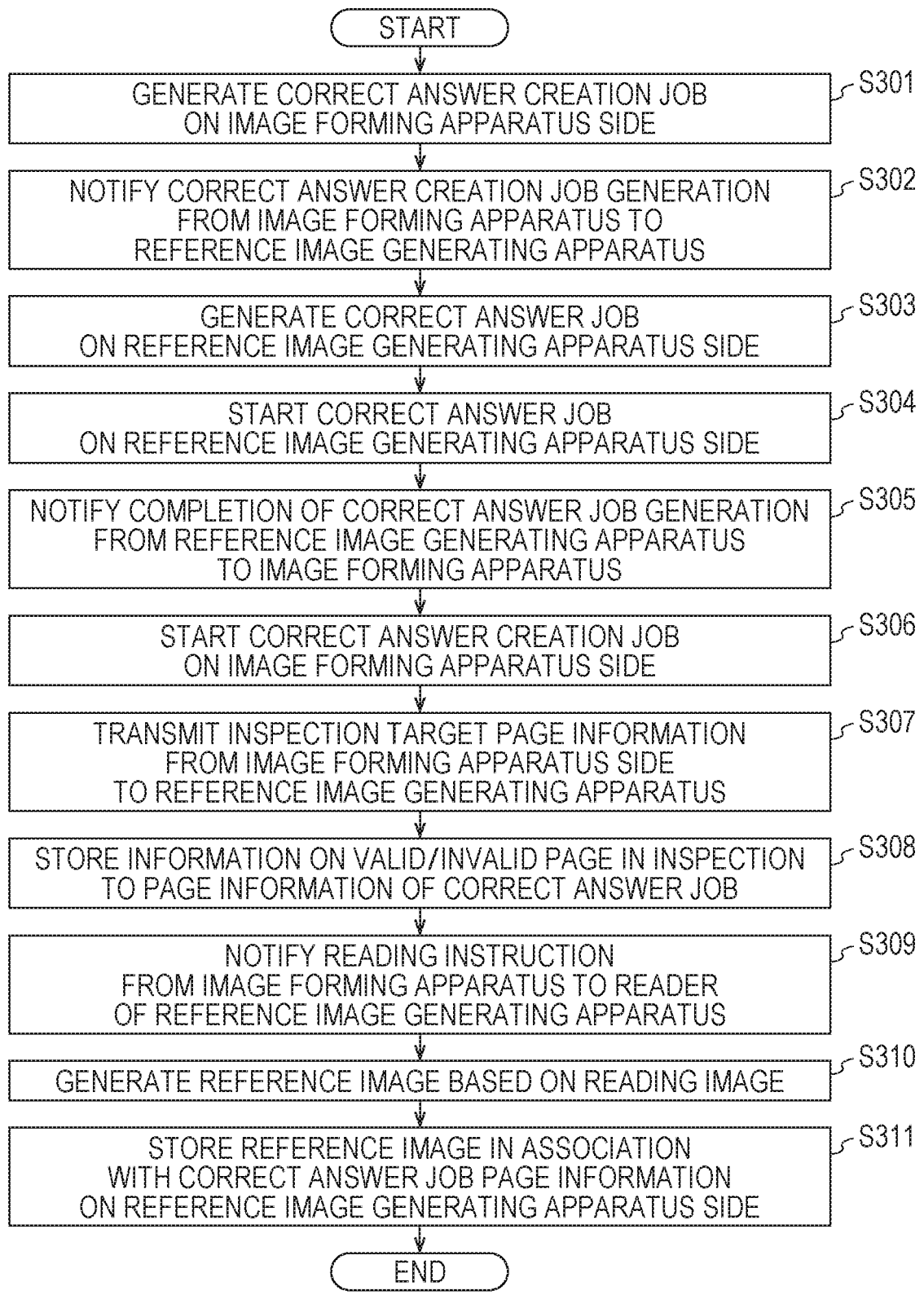
FIG. 10 is a flowchart illustrating a processing procedure for generating a reference image in a second embodiment.

FIG. 10 is a flowchart illustrating a processing procedure for generating a reference image in the second embodiment. FIG. 11 is a schematic diagram illustrating the management of reference images by correct answer jobs in the second embodiment. The processing of the flowchart of FIG. 10 is realized by the cooperation of the control unit 390 and the control unit 440.

In the present embodiment, the inspection target page information is transmitted from the image forming apparatus 300 to the reference image generating apparatus 450 for each output page of the correct answer creation job, and the reference image control unit 661 stores the inspection valid/invalid page information as the page information of the correct answer job and stores reference image of each page.

In the flowchart illustrated in FIG. 10, steps S301 to S310 are the same as steps S201 to S210 in the flowchart (FIG. 8) of the first embodiment, and thus description thereof will be omitted. In the present embodiment, the reference image control unit 661 stores the inspection valid/invalid page information as page information of the correct answer job, but stores a reference image regardless of whether the reference image is valid or invalid for automatic inspection.

As illustrated in FIG. 11, as in the first embodiment (FIG. 9), it is assumed that embossed paper is included on the second and fourth pages in four-page correct answer job output. All pages are output as a correct answer creation job, and reference images are stored for all pages. In addition, the second and fourth pages are inspection invalid pages and are not subject to automatic inspection. Therefore, the reference image control unit 661 stores a correct answer job with all pages as reference images.

Thus, the user can refer to the reference images of all pages of the correct answer job through the display of the operation display unit 380 regardless of the inspection valid/invalid page. Therefore, for example, when a user uses a function to exclude a specified area (page range) from an inspection target by editing a correct answer job, regardless of the inspection valid/invalid page, reference images can be displayed as a list, such that the user can easily understand the reference images.

The reference image generating apparatus 450 and the image forming system 100 of the present embodiment described above have the following effects.

Since the inspection valid/invalid page information is stored for each paper of a printed matter, this can save the user from selecting the pages that is not subject to inspection in advance. Further, it is possible to prevent or suppress occurrence of erroneous detection in post-process inspection.

Third Embodiment

In the first embodiment described above, the case of controlling the storage of the generated reference image has been described. In the third embodiment, the case where the reference image is not stored by not reading an image on the paper that is not subject to automatic inspection will be described. Note that the description of the same configuration as that of the first embodiment will be omitted to avoid duplication of description.

Figure 12:
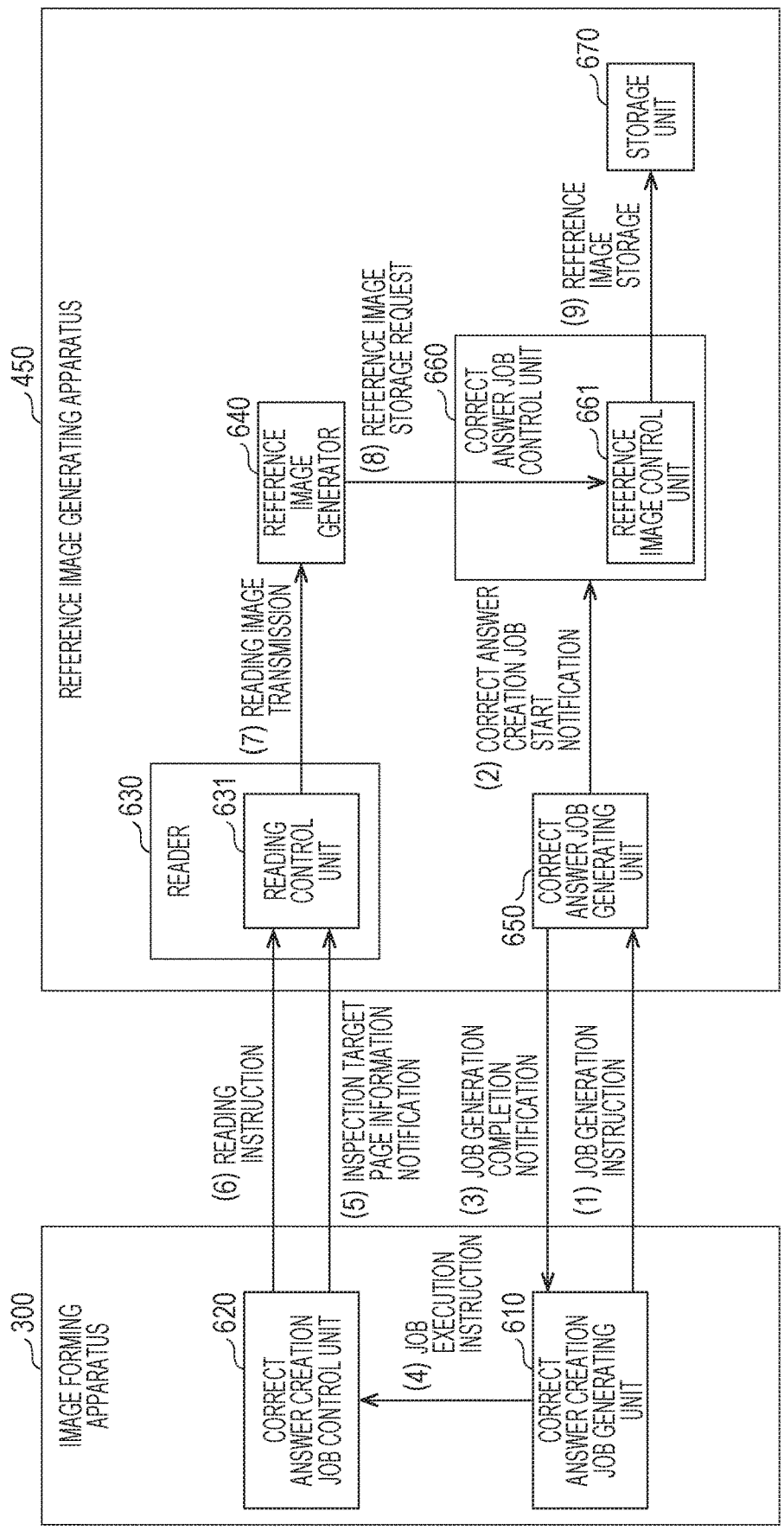
FIG. 12 is a functional block diagram illustrating the main functional configurations of an image forming apparatus and a reference image generating apparatus in the case of generating a reference image in a third embodiment.
Figure 13:
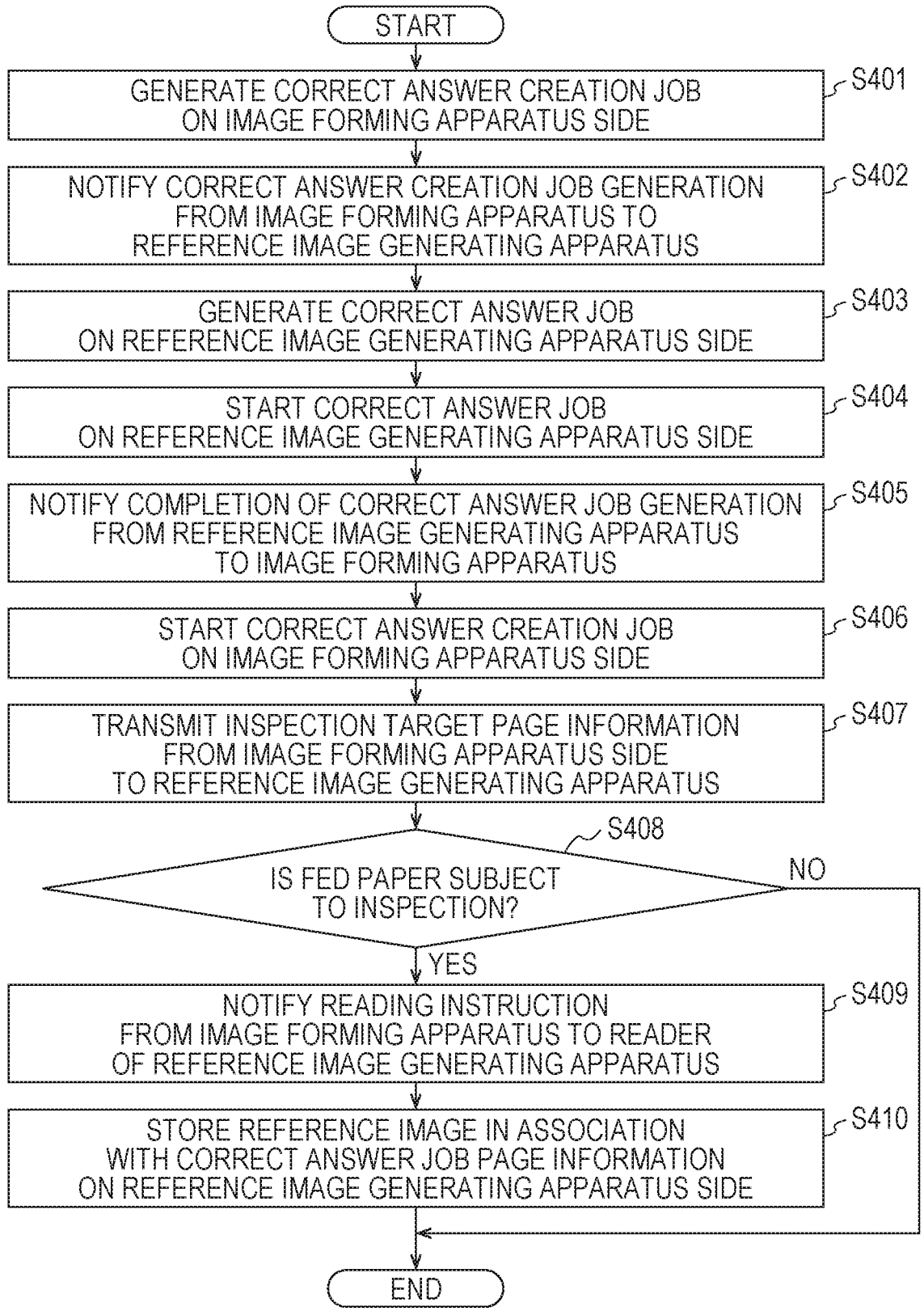
FIG. 13 is a flowchart illustrating a processing procedure for generating a reference image according to the functional configuration of FIG. 12.

FIG. 12 is a functional block diagram illustrating the main functional configurations of the image forming apparatus 300 and the reference image generating apparatus 450 in the case of generating a reference image in the third embodiment. Further, FIG. 13 is a flowchart illustrating a processing procedure for generating a reference image according to the functional configuration of FIG. 12. The process of the flowchart in FIG. 13 is realized by the cooperation of the control unit 390 and the control unit 440.

In the flowchart illustrated in FIG. 13, steps S401 to S406 are the same as steps S201 to S206 in the flowchart (FIG. 8) according to the first embodiment, and a description thereof will be omitted.

In step S407, the inspection target page information is transmitted from the image forming apparatus 300 to the reference image generating apparatus 450. The correct answer creation job control unit 620 outputs inspection target page information to the reading control unit 631 of the reader 630.

Next, the reading control unit 631 of the reader 630 determines whether or not the paper fed to the reader 630 is a paper to be inspected (step S408). When the paper fed to the reader 630 is an inspection target (step S408: YES), a reading instruction is notified from the image forming apparatus 300 to the reader 630 of the reference image generating apparatus 450 (step S409). Then, the reference image is stored in association with the page information of the correct answer job on the reference image generating apparatus 450 side (step S410), and the process is ended (END).

On the other hand, when the paper fed to the reader 630 is not the inspection target (step S408: NO), the process ends without notifying the reader 630 of the reference image generating apparatus 450 of a reading instruction from the image forming apparatus 300 (END).

In this way, only when the paper fed to the reader 630 is a paper to be inspected, the image forming apparatus 300 notifies the reader 630 of the reference image generating apparatus 450 of a reading instruction. As a result, only the reference image effective in the inspection is generated and stored by the reference image generating apparatus 450.

The reference image generating apparatus 450 and the image forming system 100 of the present embodiment described above have the following effects.

Since the reader 630 cannot read a paper for which a paper that is not subject to automatic inspection is set, an invalid reference image in automatic inspection is not stored. Therefore, it is possible to save the user from selecting pages that are not subject to inspection in advance. Further, it is possible to prevent or suppress occurrence of erroneous detection in post-process inspection.

Fourth Embodiment

In the first embodiment, the case where the generated reference image is stored as the correct answer job page corresponding to the correct answer job and inspection job pages has been described. In the fourth embodiment, the case will be described where page numbers of the correct answer job are assigned to the generated reference images in the order of storing. Note that the description of the same configuration as that of the first embodiment will be omitted to avoid duplication of description.

Figure 14:
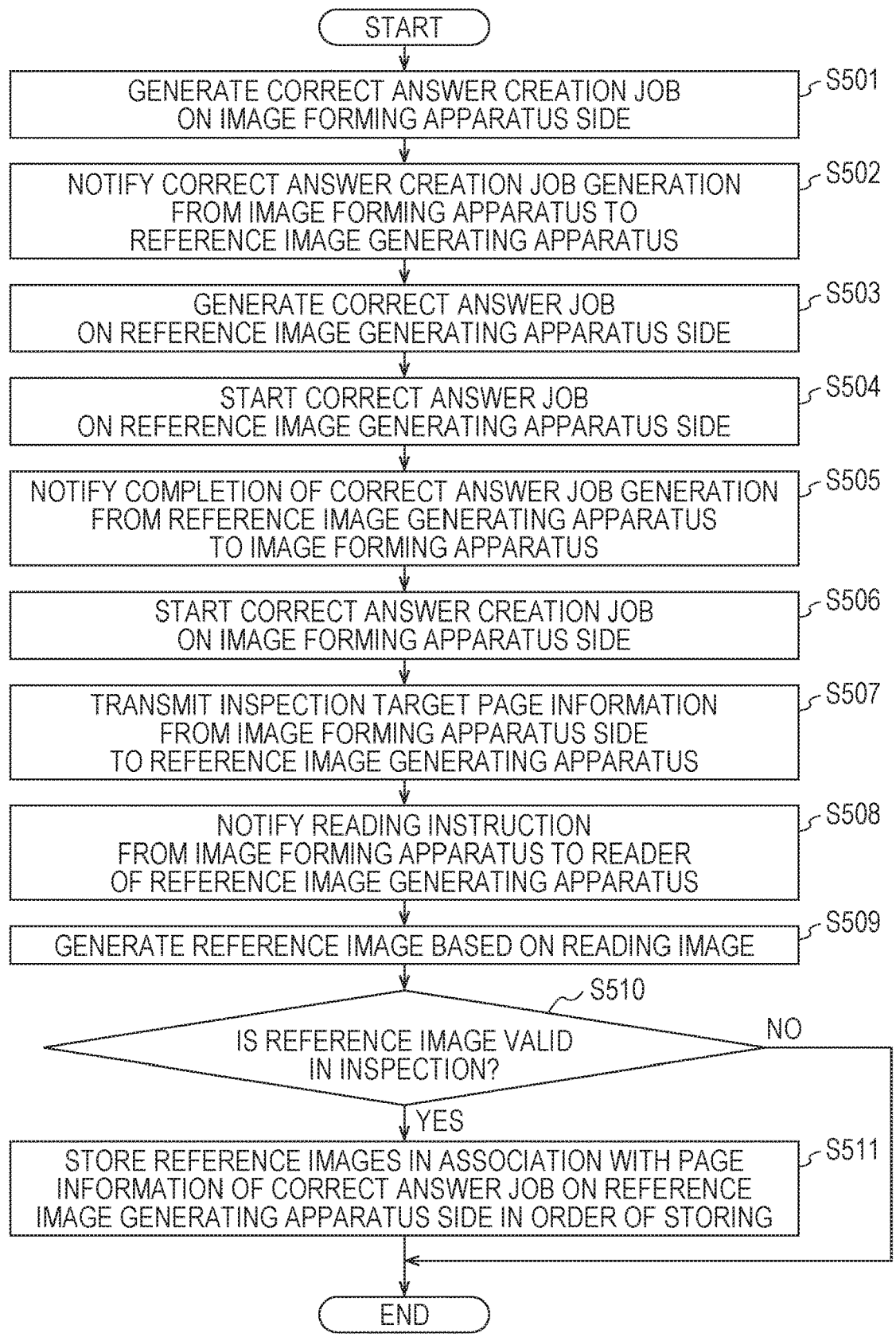
FIG. 14 is a flowchart illustrating a processing procedure for generating a reference image in a fourth embodiment.

FIG. 14 is a flowchart illustrating a processing procedure for generating a reference image in the fourth embodiment, and FIG. 15 is a schematic view illustrating management of the reference image by a correct answer job in the fourth embodiment. The processing of the flowchart in FIG. 14 is realized by the cooperation of the control unit 390 and the control unit 440.

In the flowchart illustrated in FIG. 14, steps S501 to S509 correspond to steps S201 to S207, S209, and S210 of the flowchart of the first embodiment (FIG. 8), respectively, and thus description thereof will be omitted.

In step S510, the reference image control unit 661 determines whether or not the generated reference image is valid in the inspection. When this reference image is valid in the inspection (step S510: YES), the reference image control unit 661 stores the reference images in association with the page information of the correct answer job on the reference image generating apparatus 450 side in the order of storing (step S511). On the other hand, when the reference image is not valid in the inspection, that is, invalid (step S511: NO), the process ends without storing the reference image (END).

As illustrated in FIG. 15, as in the first embodiment (FIG. 9) and the second embodiment (FIG. 11), it is assumed that embossed paper is included in the second and fourth pages in the four-page correct answer creation job output. Although all pages are output as a correct answer creation job, the second and fourth pages are not subject to inspection and are not stored as reference images for a correct answer job. In addition, the second and fourth pages are inspection invalid pages and are not subject to automatic inspection.

In the present embodiment, the reference image control unit 661 stores the reference image generated for the first page of the correct answer creation job as the first page of the correct answer job. However, the reference image generated for the third page of the correct answer creation job is stored as the second page, not the third page of the correct answer job.

As described above, in the present embodiment, when the reference image is stored in the reference image control unit 611, the page numbers are assigned in the order of the storage of the reference images. Further, in the inspection in automatic inspection, the inspection is performed by comparing the reference image with the read image to be inspected, excluding the inspection invalid page, in the order of page numbers, that is, in the order of the storage of the reference images. For example, in the above-described example, the fine paper on the third page of the inspection job is compared with the reference image on the second page of the correct answer job.

In addition to the effects of the first embodiment, the reference image generating apparatus 450 and the image forming system 100 of the present embodiment described above have the following effects.

When the reference image is stored, page numbers are assigned in the order in which the reference image is stored, such that management of page information in the correct answer job is facilitated.

Fifth Embodiment

In a fifth embodiment, the case will be described in which, when all pages of a correct answer job are inspection invalid pages, the user is notified of this, and the process of creating a reference image is stopped. Note that the description of the same configuration as that of the first embodiment will be omitted to avoid duplication of description.

Figure 16:
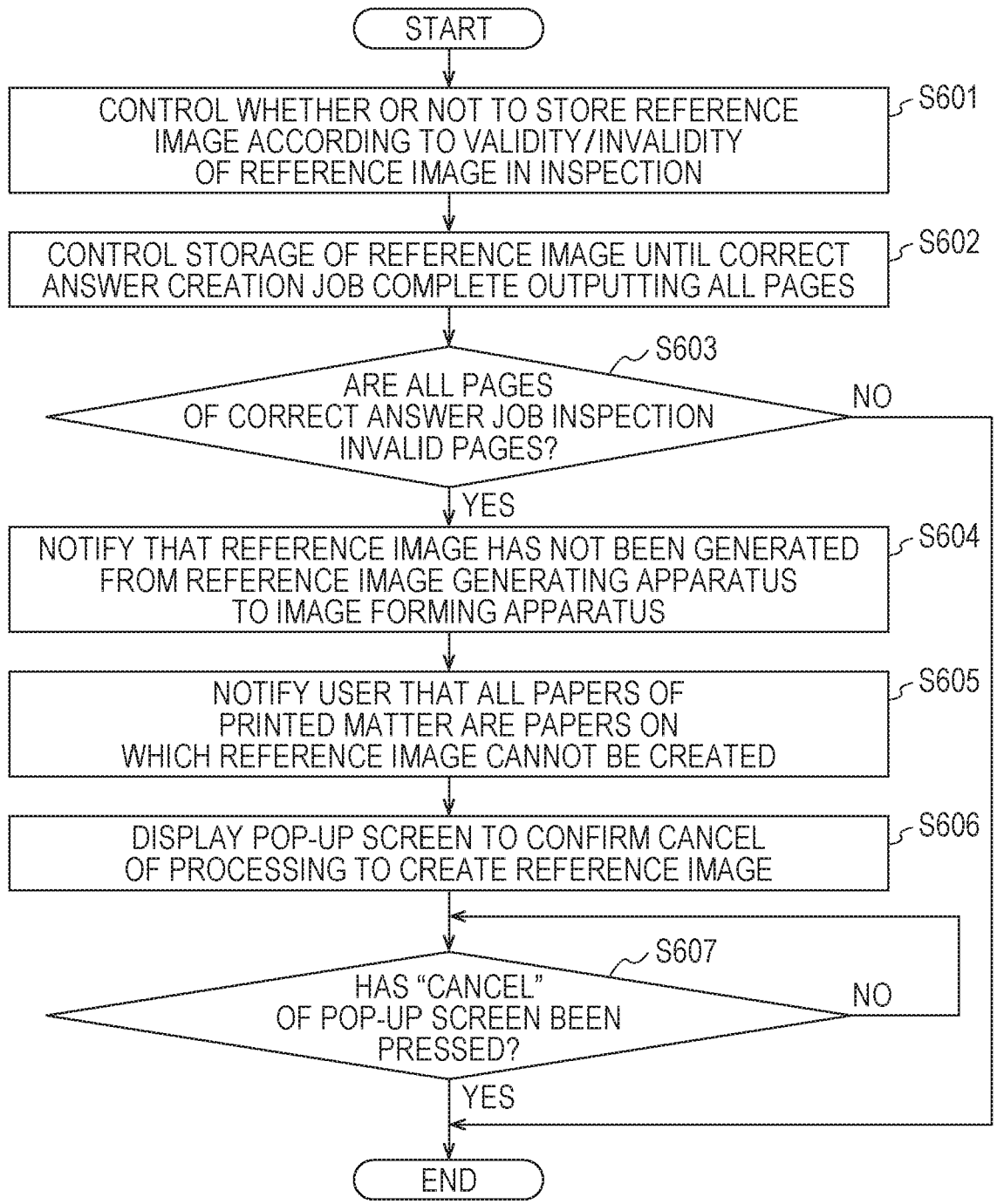
FIG. 16 is a flowchart illustrating a processing procedure for generating a reference image in a fifth embodiment.
Figure 17:
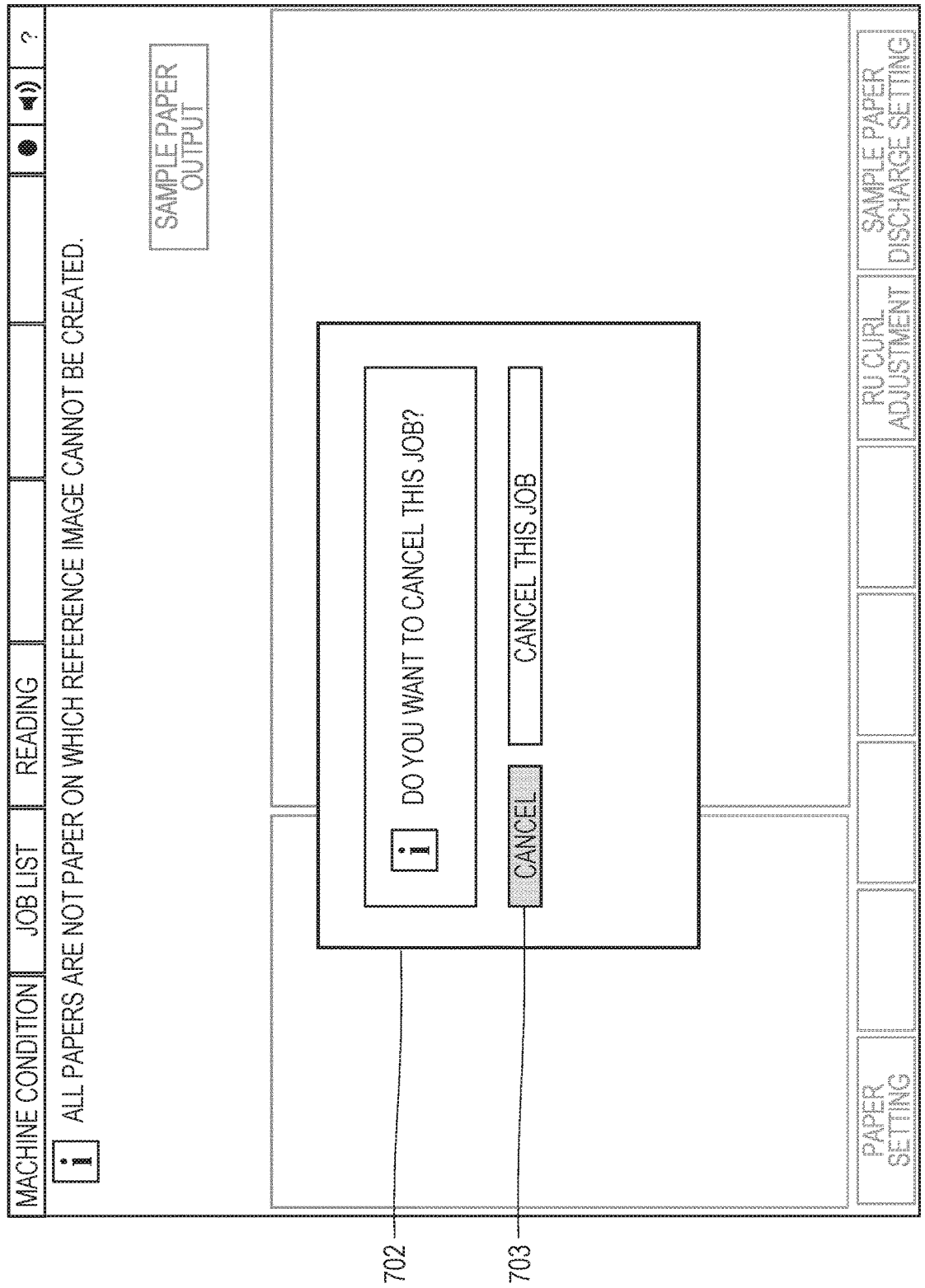
FIG. 17 is a schematic view illustrating a pop-up screen for confirming cancellation of a process of creating a reference image.

FIG. 16 is a flowchart illustrating a processing procedure for generating a reference image in the fifth embodiment. The processing of the flowchart of FIG. 16 is realized by the cooperation of the control unit 390 and the control unit 440. FIG. 17 is a schematic view illustrating a pop-up screen for confirming cancellation of the process of creating a reference image.

As illustrated in FIG. 16, first, it is controlled whether or not to store a reference image according to the validity/invalidity of the reference image in the inspection (step S601). The reference image control unit 661 executes the processing of steps S201 to S212 in the flowchart (FIG. 8) of the first embodiment. Since the processing is the same as the processing of the first embodiment, description thereof will be omitted.

Next, the storage of the reference image is controlled until the correct answer creation job completes outputting all pages (step S602). The reference image control unit 661 controls the storage of the reference image by repeating the processing of steps S209 to S212 in the flowchart (FIG. 8) of the first embodiment until the correct answer creation job output all pages.

Next, it is determined whether or not all pages of the correct answer job are inspection invalid pages (step S603). If all the pages of the correct answer job are not inspection invalid pages, that is, if there is at least one valid page (step S603: NO), the process ends (END). On the other hand, if all the pages of the correct answer job are inspection invalid pages (step S603: YES), the reference image generating apparatus 450 notifies the image forming apparatus 300 that the reference image has not been generated (step S604).

Next, the user is notified that all papers of a printed matter are papers on which a reference image cannot be created (step S605). As illustrated in FIG. 17, the image forming apparatus 300 outputs a message such as "All papers are papers on which a reference image cannot be created" to a display screen 700 and notifies the user that all the papers of the printed matter are papers on which a reference image cannot be created Next, a pop-up screen 702 for confirming cancellation of the process for creating the reference image is displayed (step S606). The image forming apparatus 300 displays on the display screen 700 the pop-up screen 702 for confirming the user to cancel the process (job) for creating the reference image.

Next, it is determined whether or not a "cancel" button 703 on the pop-up screen 702 has been pressed (step S607). The user confirms the message "Do you want to cancel this job?" displayed on the pop-up screen 702, and selects the "cancel" button 703 (an option button) on the pop-up screen 702. If the "cancel" button 703 has been pressed (step S607: YES), the process ends. Thereby, the process of creating the reference image is stopped. As a result, the target correct answer job is deleted and is not stored as a correct answer job.

In this way, if all pages of the correct answer creation job are set as papers that are not subject to automatic inspection, there is no reference image to be stored. Therefore, by displaying the screen 700 after completion of outputting all pages of the correct answer creation job, it is possible to prevent the correct answer job having no reference image from being generated and stored. Further, by displaying the screen 700, it is also possible to notify the user that there is a possibility of an error in the paper feed tray setting or job setting.

Note that the reason for performing the determination when all papers are output is that in the case of page mode (real) output, not all page information can be received at the start of receiving a print job.

Although the image forming system 100 and the control program in the embodiments of the present invention have been described and illustrated in detail, the disclosed embodiments are made for purposes of illustration and example only and not limitation. The scope of the present invention should be interpreted by terms of the appended claims, and can be appropriately added, modified, and omitted by those skilled in the art within the scope of the technical idea.

For example, in the above-described embodiments, a case is described in which the reference image generating apparatus 450 determines validity/invalidity in automatic inspection of the reference image depending on whether the printed matter is/is not subject to the automatic inspection. However, the present invention is not limited to such a case. For example, the validity/invalidity in automatic inspection of the reference image is determined on the image forming apparatus 300 side depending on whether the printed matter is/is not subject to automatic inspection, and the determination result may be transmitted to the reference image generating apparatus 450.

Further, in the above-described embodiment, the case where the control unit 440 of the first post-processing apparatus 400 functions as the control unit of the reference image generating apparatus 450 has been described. However, the present invention is not limited to such a case, and the reference image generating apparatus 450 may include a control unit independent of the control unit 440.

Further, the control program for the image forming system 100 may be provided by a computer-readable recording medium such as a USB memory, a flexible disk, or a CD-ROM, or may be provided online via a network such as an Internet. In this case, the program recorded on the computer-readable recording medium is usually transferred and stored in a memory or storage. Further, this control program may be provided as, for example, a single application software, or may be incorporated in the software of each apparatus as one function of the image forming system 100.

What is claimed is:

1. A reference image generating apparatus comprising:
a reader that reads a printed matter transported from an image forming apparatus; and
a hardware processor that is configured to:
generate a reference image for automatically inspecting the printed matter based on a read image generated by reading the printed matter; and
acquire, from the image forming apparatus, information on whether or not each paper of the printed matter to be transported to the reader is subject to automatic inspection,
wherein:
when the paper is subject to the automatic inspection, the hardware processor stores that the reference image is valid in the automatic inspection,
when the paper is not subject to the automatic inspection, the hardware processor stores that the reference image is invalid in the automatic inspection,
when the reference image is valid in the automatic inspection, the hardware processor stores the reference image, and
when the reference image is invalid in the automatic inspection, the hardware processor does not store the reference image.

2. The reference image generating apparatus according to claim 1, wherein the hardware processor assigns page numbers in an order in which the generated reference images are stored, and stores the reference images.

3. The reference image generating apparatus according to claim 1, wherein the hardware processor generates a management job for storing the reference image in association with a fact that the reference image is valid or invalid in automatic inspection.

4. The reference image generating apparatus according to claim 3, wherein when all papers of the printed matter is not subject to automatic inspection, the hardware processor deletes the management job.

5. An image forming system comprising:
an image forming apparatus that forms an image on a paper based on a print job and output a printed matter on which the image is formed;
the reference image generating apparatus according to claim 1;
a paper transport apparatus that transports the printed matter from the image forming apparatus to the reference image generating apparatus; and
a notifier that notifies a user that all papers of the printed matter are papers on which a reference image cannot be created, when all the papers of the printed matter are not subject to automatic inspection, the notifier displaying a pop-up screen for confirming cancellation of a process of creating a reference image.

6. A reference image generating apparatus comprising:
a reader that reads an image of a printed matter transported from an image forming apparatus; and
a hardware processor that is configured to:
generate a reference image for automatically inspecting the printed matter based on a read image generated by reading the image by the reader; and
acquire, from the image forming apparatus, information on whether or not each paper of the printed matter to be transported to the reader is subject to automatic inspection, wherein:
when the paper is subject to the automatic inspection, the hardware processor stores that the reference image is valid in the automatic inspection,
when the paper is not subject to the automatic inspection, the hardware processor stores that the reference image is invalid in the automatic inspection, and
regardless of whether the reference image is valid or invalid in the automatic inspection, the hardware processor stores the reference image.

7. The reference image generating apparatus according to claim 6, wherein the hardware processor
assigns page numbers in an order in which the generated reference images are stored, and stores the reference images.

8. The reference image generating apparatus according to claim 6, wherein the hardware processor
generates a management job for storing the reference image in association with a fact that the reference image is valid or invalid in automatic inspection.

9. An image forming system comprising:
an image forming apparatus that forms an image on a paper based on a print job and output a printed matter on which the image is formed;
the reference image generating apparatus according to claim 6;
a paper transport apparatus that transports the printed matter from the image forming apparatus to the reference image generating apparatus; and
a notifier that notifies a user that all papers of the printed matter are papers on which a reference image cannot be created, when all the papers of the printed matter are not subject to automatic inspection, the notifier displaying a pop-up screen for confirming cancellation of a process of creating a reference image.

10. A reference image generating apparatus comprising:
a reader that reads an image of a printed matter transported from an image forming apparatus; and
a hardware processor that is configured to generate a reference image for automatically inspecting the printed matter based on a read image generated by reading the image by the reader;
wherein:
the reader acquires, from the image forming apparatus, information on whether or not each paper of the printed matter to be transported to the reader is subject to automatic inspection,
when the information acquired by the reader indicates that the paper is subject to the automatic inspection, the reader reads an image of the paper, and the hardware processor generates the reference image for automatically inspecting the printed matter based on the read image of the paper that is subject to the automatic inspection, and
when the information acquired by the reader indicates that the paper is not subject to the automatic inspection, the reader does not read an image of the paper and the hardware processor does not generate the reference image.

11. The reference image generating apparatus according to claim 10, wherein the hardware processor
assigns page numbers in an order in which the generated reference images are stored, and stores the reference images.

12. The reference image generating apparatus according to claim 10, wherein the hardware processor
generates a management job for storing the reference image in association with a fact that the reference image is valid or invalid in automatic inspection.

13. An image forming system comprising:
an image forming apparatus that forms an image on a paper based on a print job and output a printed matter on which the image is formed;
the reference image generating apparatus according to claim 10;
a paper transport apparatus that transports the printed matter from the image forming apparatus to the reference image generating apparatus; and
a notifier that notifies a user that all papers of the printed matter are papers on which a reference image cannot be created, when all the papers of the printed matter are not subject to automatic inspection, the notifier being displaying a pop-up screen for confirming cancellation of a process of creating a reference image.

14. A reference image generation method comprising:
(a) acquiring, from an image forming apparatus, information on whether or not each paper of a printed matter printed by the image forming apparatus is subject to automatic inspection;
(b) reading a printed matter transported from the image forming apparatus with a reader;
(c) generating a reference image for automatically inspecting the printed matter based on a read image generated by reading the printed matter in the (b); and
(d) controlling storage of the reference image generated in the (c),
wherein, in the (d),
when the paper is subject to automatic inspection, a fact that the reference image is valid in the automatic inspection is stored,
when the paper is not subject to automatic inspection, a fact that the reference image is invalid in the automatic inspection is stored,
when the reference image is valid in the automatic inspection, the reference image is stored, and
when the reference image is invalid in the automatic inspection, the reference image is not stored.

15. The reference image generation method according to claim 14,
wherein, in the (d),
page numbers are assigned in an order in which the generated reference images are stored, and the reference images are stored.

16. The reference image generation method according to claim 14,
wherein, in the (d),
a management job is generated for storing the reference image in association with information indicating whether the reference image is valid or invalid in an inspection.

17. The reference image generation method according to claim 16,
wherein, in the (d),
the management job is deleted when all papers of the printed matter are not subject to automatic inspection.

18. The reference image generation method according to claim 14, further comprising:
(e) notifying a user that all papers of the printed matter are papers on which a reference image cannot be created, when all the papers of the printed matter are not subject to automatic inspection, and displaying a pop-up screen for confirming cancellation of a process of creating the reference image.

19. A non-transitory recording medium storing a computer readable reference image generation program that causes a computer to execute the reference image generation method according to claim 14.

20. A reference image generation method comprising:
(a) acquiring, from an image forming apparatus, information on whether or not each paper of a printed matter printed by the image forming apparatus is subject to automatic inspection;
(b) reading a printed matter transported from the image forming apparatus with a reader;
(c) generating a reference image for automatically inspecting the printed matter based on the read image generated by reading the printed matter in the (b); and
(d) storing the reference image generated in the (c),
wherein, in the (d),
when the paper is subject to the automatic inspection, a fact that the reference image is valid in the automatic inspection is stored,
when the paper is not subject to the automatic inspection, a fact that the reference image is invalid in the automatic inspection is stored, and
regardless of whether the reference image is valid or invalid in the automatic inspection, the reference image is stored.

21. The reference image generation method according to claim 20,
wherein, in the (d),
page numbers are assigned in an order in which the generated reference images are stored, and the reference images are stored.

22. The reference image generation method according to claim 20,
wherein, in the (d),
a management job is generated for storing the reference image in association with information indicating whether the reference image is valid or invalid in an inspection.

23. The reference image generation method according to claim 20, further comprising:
(e) notifying a user that all papers of the printed matter are papers on which a reference image cannot be created, when all the papers of the printed matter are not subject to automatic inspection, and displaying a pop-up screen for confirming cancellation of a process of creating the reference image.

24. A non-transitory recording medium storing a computer readable reference image generation program that causes a computer to execute the reference image generation method according to claim 20.

25. A reference image generation method comprising:
(a) acquiring, from an image forming apparatus, information on whether or not each paper of a printed matter printed by the image forming apparatus is subject to automatic inspection;
(b) reading a printed matter transported from the image forming apparatus with a reader;
(c) generating a reference image for automatically inspecting the printed matter based on a read image generated by reading the printed matter; and
(d) storing the reference image generated,
wherein:
when the information acquired from the image forming apparatus indicates that the paper is subject to the automatic inspection, in the (b), an image of the paper is read, and in the (c), the reference image for automatically inspecting the printed matter is generated based on the read image of the paper that is subject to the automatic inspection, and
when the information acquired by the reader indicates that the paper is not subject to the automatic inspection, an image of the paper is not read, and the reference image is not generated.

26. The reference image generation method according to claim 25,
wherein, in the (d),
page numbers are assigned in an order in which the generated reference images are stored, and the reference images are stored.

27. The reference image generation method according to claim 25,
wherein, in the (d),
a management job is generated for storing the reference image in association with information indicating whether the reference image is valid or invalid in an inspection.

28. The reference image generation method according to claim 25, further comprising:
(e) notifying a user that all papers of the printed matter are papers on which a reference image cannot be created, when all the papers of the printed matter are not subject to automatic inspection, and displaying a pop-up screen for confirming cancellation of a process of creating the reference image.

29. A non-transitory recording medium storing a computer readable reference image generation program that causes a computer to execute the reference image generation method according to claim 25.

* * * * *